(12) United States Patent
Cuplin

(10) Patent No.: US 7,405,918 B2
(45) Date of Patent: Jul. 29, 2008

(54) INDUCTIVE LOAD CONTROL

(75) Inventor: Richard P Cuplin, Canton, MI (US)

(73) Assignee: Yazaki North America, Inc., Canton, MI (US)

(*) Notice: Subject to any disclaimer, the term of this patent is extended or adjusted under 35 U.S.C. 154(b) by 317 days.

(21) Appl. No.: 11/094,065

(22) Filed: Mar. 30, 2005

(65) Prior Publication Data

US 2006/0126258 A1 Jun. 15, 2006

Related U.S. Application Data

(60) Provisional application No. 60/635,203, filed on Dec. 10, 2004.

(51) Int. Cl.
*H01H 9/00* (2006.01)
*H01H 47/00* (2006.01)
*H01H 51/22* (2006.01)
*H01H 51/30* (2006.01)
*H01H 47/32* (2006.01)

(52) U.S. Cl. .................. 361/160; 361/154; 361/159

(58) Field of Classification Search ............ 361/160, 361/154, 159
See application file for complete search history.

(56) References Cited

U.S. PATENT DOCUMENTS

| | | | |
|---|---|---|---|
| 4,326,234 A | 4/1982 | Shuey | |
| 4,767,840 A | 8/1988 | Shannon et al. | |
| 4,890,188 A | 12/1989 | Russell et al. | |
| 5,038,247 A * | 8/1991 | Kelley et al. | 361/154 |
| 5,082,097 A | 1/1992 | Goeckner et al. | |
| 5,107,391 A | 4/1992 | Siepmann | |
| 5,235,490 A | 8/1993 | Frank et al. | |
| 5,249,658 A | 10/1993 | Goeckner et al. | |
| 5,402,302 A | 3/1995 | Boucheron | |
| 5,475,561 A | 12/1995 | Goeckner et al. | |
| 5,914,849 A | 6/1999 | Perreira | |
| 5,999,396 A | 12/1999 | Streich | |
| 6,351,162 B1 * | 2/2002 | Schwartz | 327/110 |
| 6,798,633 B1 | 9/2004 | Rossbach | |
| 2002/0114120 A1 | 8/2002 | Ehara | |
| 2002/0167777 A1 | 11/2002 | Parisi et al. | |

* cited by examiner

*Primary Examiner*—Michael J Sherry
*Assistant Examiner*—Dharti H Patel
(74) *Attorney, Agent, or Firm*—Harness, Dickey & Pierce, P.L.C.

(57) ABSTRACT

A method is provide for controlling an inductive load device (ILD). The method includes providing a voltage potential across ILD and disabling a flow of current through the ILD resulting from the voltage potential across the ILD when a voltage across a sensing device rises to substantially equal an upper threshold value. The rate at which the voltage across the sensing device rises is a function of resistive and inductive characteristics of the ILD. The method additionally includes enabling the flow of current through the ILD resulting from the voltage potential across the ILD when the voltage across the sensing device decays to substantially equal a lower threshold value. The rate at which the voltage across the sensing device decays is a function of the resistive and inductive characteristics of the ILD.

10 Claims, 4 Drawing Sheets

INDUCTIVE LOAD CONTROL

CROSS REFERENCE TO RELATED APPLICATIONS

This application claims the benefit of U.S. Provisional Application No. 60/635,203, filed on Dec. 10, 2004.

INTRODUCTION

The invention relates generally to the operation of inductive load devices or apparatus and more particularly to a control circuit for controlling the current through an inductive load device or apparatus.

In many industries, such as the automotive industry, inductive load devices or apparatus, for example, relay switches, solenoids, DC motors, and an inductor in conjunction with other loads such as an LED, are driven directly from a DC power source, i.e. a battery. The power sources that drive inductive load devices can vary such that an extensive range of voltage may be applied through a device. For example, automotive batteries can range from 6 to 42 volts. Generally, the design of inductive load devices is based on the amount of current needed to flow through the coil of the device to generate a desired magnetic force. That is, the size of the wire and number of turns on the coil are configured such that a given amount of power supplied to the device will create current flow sufficient to generate the desired magnetic force. Thus, inductive load devices are typically designed to operate at the lower end of the possible voltage range. Any additional power is dissipated in the device, creating an inefficient use of power. In the case of inductive switches such as relays and solenoids, pulse width modulation (PWM) has been used to excite the coils and reduce power consumption. However, letting the voltage fall to zero affects the hold-in characteristics of the switch. To avoid this, some PWM scheme control the voltage drop such that the voltage does not fall all the way to zero, but instead is modulated between an upper and lower non-zero voltage. However, this requires an additional power source.

Various control schemes exist that attempt to control the voltage applied such that a substantially constant voltage is provided to the inductive load device or apparatus. However, controlling the voltage is inefficient because coils may have a thermal coefficient that is affected by heat generated from current flowing through the windings or a rise in temperature of the environment surrounding the inductive load device or apparatus. For example, copper windings have a very high temperature coefficient that can change the resistive characteristics of the coil up to 40% over a significant temperature rise. That is, for example, copper windings of an inductive load device driven by an 8 volt power source may generate 40 mA of current at 70° F. (21° C.). But, at 250° F. (121° C.) the winding will longer generate 40 mA and may only generate 25 mA. Therefore, applying a substantially constant voltage does not compensate for a change in resistance of the inductive load coils. The current flowing through the coil will change in accordance to the change in resistance and may drop below the level needed to activate or enable the inductive load device.

Therefore, there exists in the art a need to efficiently drive an inductive load device or apparatus at the lowest possible power needed to enable the device or apparatus, regardless of the amount of excess voltage delivered to the device or apparatus.

BRIEF SUMMARY OF THE INVENTION

In one form, the present teachings provide a method for regulating current through an inductive load device (ILD). The method includes providing a voltage across the ILD, thereby causing current to flow through the ILD that is a function of resistive and inductive characteristics of the ILD. The current flowing through the ILD flows through a sensing device of a control circuit connected to the ILD. The current flowing through the sensing device induces a voltage across the sensing device. The voltage across the sensing device is measured and the flow of current through the ILD that is generated by the voltage across the ILD is disabled when the voltage across the sensing device rises to substantially equal an upper threshold value. The rise time of the voltage across the sensing device is a function of the resistive and inductive characteristics of the ILD.

When the current generated by the voltage across the ILD is disabled, the ILD uses stored energy to generate a recirculating current that continues to flow through the sensing device and the ILD. The method additionally includes measuring a voltage across the sensing device induced by a recirculating current. When the voltage across the sensing device, induced by the recirculating current, decays to substantially equal a lower threshold value, the flow of current through the ILD is again enabled. The decay time of the voltage across the sensing device is also a function of the resistive and inductive characteristics of the ILD. Thus, the control circuit modulates the current flowing through the ILD in accordance with the rise and decay of the voltage across the sensing device. The voltage across the sensing device is induced by the current flowing through the ILD, which is a function of the resistive and inductive characteristics of the ILD. Therefore, the rise time and the decay time of the voltage across the sensing device, that is the timing of the control circuit, is purely a function of the resistive and inductive characteristics of the ILD. Since the timing of the control circuit is purely a function of the resistive and inductive characteristics of the ILD and a known function of the voltage applied across the ILD, the voltage applied across the ILD can be changed with a known affect on the control circuit timing but without changing the components of the control circuit.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Furthermore, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

Figure 1:
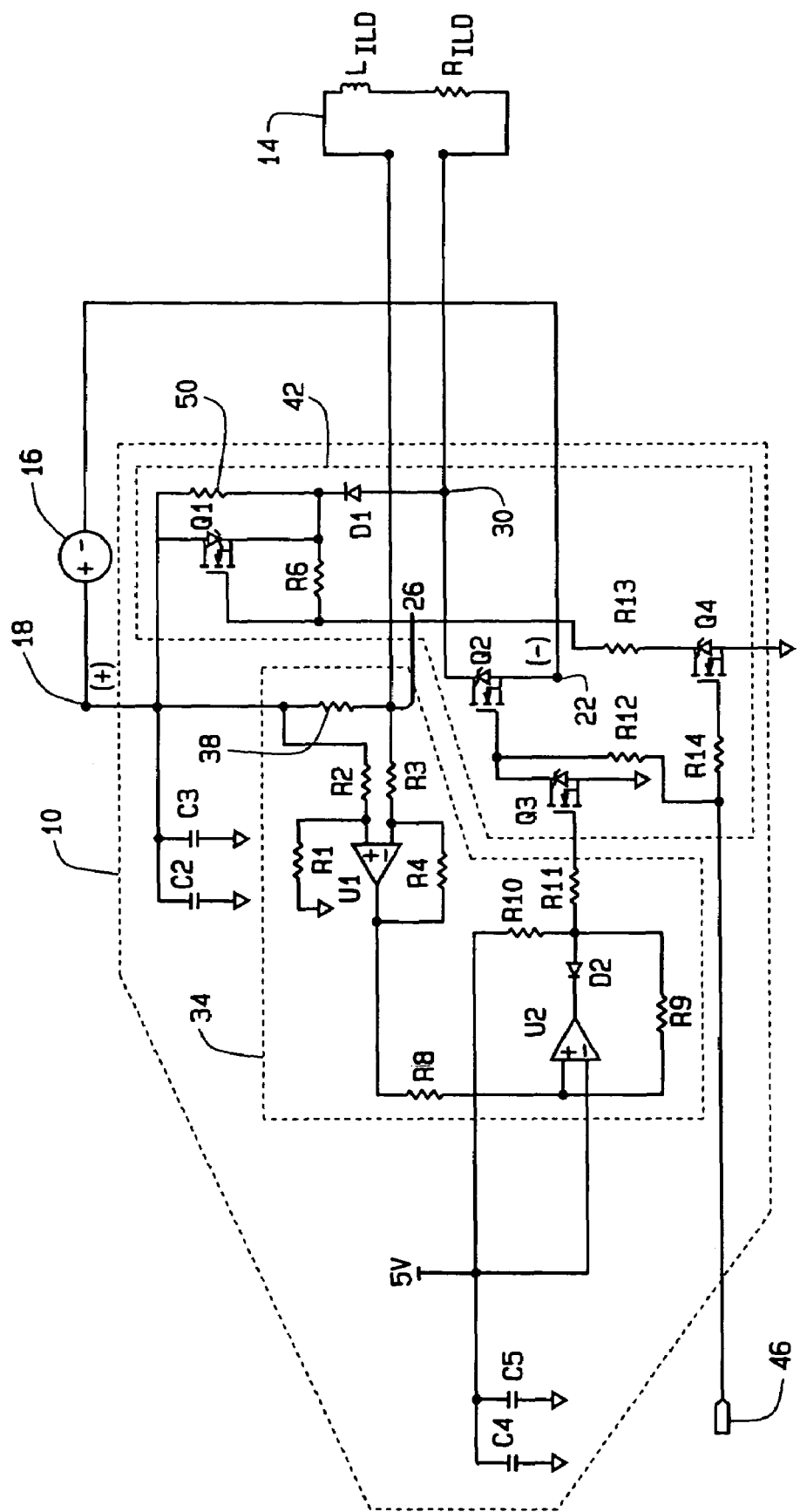
FIG. 1 is a schematic of a control circuit for controlling current flowing through an inductive load device, in accordance with the teachings of the present invention.

With reference to FIG. 1, a control circuit 10 for controlling current through an inductive load device (ILD) 14, is illustrated. The ILD 14 can be any inductive load device, for example, a relay switch, a solenoid, a motor or an inductor in conjunction with another load such as an LED. Those of ordinary skill in the art will appreciate that, due to the nature of inductive load devices, ILD 14 will have electrically inductive and resistive characteristics. The inductive and resistive characteristic can by the result of one or more components of the ILD 14. For example, ILD 14 is illustrated to generally include an inductive device $L_{ILD}$, shown as an inductive coil, and resistive component $R_{ILD}$, shown as a resistor. However, the ILD 14 could also include a single component having inductive and resistive characteristics or a plurality of components that cumulatively provide the inductive and resistive characteristics of the ILD 14. Additionally, it will be appreciated that inductive load devices are also referred to in the art as electromagnetic load devices.

A direct current (DC) power source 16 is connected to the control circuit 10 at a positive terminal 18 and a negative terminal 22 and across the ILD 14 a positive node 26 and a negative node 30. As described below, the operation of the control circuit 10 is based on the resistive and inductive characteristics of the ILD 14. Therefore, the DC power source 16 can have varying voltage ratings without affecting the operation of the control circuit 10. For example, the DC power source 16 can interchangeably have a voltage rating of 12 volts, 32 volts or 42 volts with a known affect on the current rise time but without affecting the current control of the control circuit 10. That is, the timing of the control circuit 10 will change in a know manner, but the current flowing through the ILD 14 will be controlled in the same manner and within the same limits. Accordingly, the components of the control circuit 10 do not have to be changed to accommodate different voltage ratings of the power source 16.

The control circuit 10 includes measuring sub-circuit 34 that monitors a level of current flowing though the ILD 14 by measuring a voltage across a sensing device 38. The sensing device 38 can be any suitable current carrying device that generates a voltage proportional to a current flowing through the sensing device, for example a resistor, as illustrated in FIG. 1. The control circuit further includes a switching sub-circuit 42 that responds to an output of the measuring sub-circuit to control the flow of current through the ILD 14. That is, the switching sub-circuit modulates current through the ILD 14 induced by a voltage across the ILD 14 provided by the power source 16. More specifically, the switching sub-circuit enables, or increases, and disables, or decreases, current flowing though the ILD 14 induced by the voltage across the ILD 14, in response to a signal output from the measuring sub-circuit 34.

Generally, the power source 16 provides a voltage potential across the ILD 14. The measuring sub-circuit 34 monitors the amount of current flowing through the ILD 14 by measuring the voltage across the sensing device 38. The voltage across the sensing device 38 is induced by the current flowing through the ILD that also flows through the sensing device 38. When the current through the ILD 14, i.e. the current through the sensing device 38, rises to an upper current threshold, determined by the components of the measuring sub-circuit 34, the measuring sub-circuit 34 outputs a disable signal to the switching sub-circuit 42 indicating that the upper current threshold has been reached. The components of the measuring sub-circuit 34 are selected so that the level of current flowing through the ILD 14 at the upper current threshold is a predetermined margin above a trigger point of the ILD 14. The trigger point is the point at which current through the ILD 14 is sufficient to enable the ILD 14. Enablement of the ILD 14, as used herein, will be understood to mean that sufficient current is flowing through the ILD 14 to enable the ILD 14 to perform a designed function of the ILD 14.

For example, a relay switch is enabled when current through the relay is sufficient to activate the relay closing the relay contacts. Similarly, a motor is enabled when current through the windings of the motor is sufficient to cause a rotor to turn at a desired RPM. The trigger point is based on the inductive and resistive characteristics of the ILD 14 and the margin is based on the operational characteristics of the various components in the measuring sub-circuit 34.

The rise time of the current through and the voltage across the sensing device 38 is based on the current flowing through the ILD 14 and is therefore a function of the resistive and inductive characteristics of the ILD 14. In response to the disable signal, the switching sub-circuit 42 disables voltage across the ILD 14 causing the current flowing through the ILD 14 to decrease.

However, due to the inductive characteristics of the ILD 14, a recirculating current continues to flow through the ILD 14 and the sensing device 38. The measuring sub-circuit 34 monitors the amount of recirculating current flowing through the ILD 14 and the sensing device 38 by measuring the voltage across the sensing device 38. When the current through the sensing device 38, i.e. the current through the IDL 14, and the voltage across the sensing device 38 decays to a lower current threshold, also determined by the components of the measuring sub-circuit 34, the measuring sub-circuit 34 outputs an enable signal to the switching sub-circuit indicating that the lower threshold has been reached. The components of the measuring sub-circuit 34 are selected so that the level of current flowing through the ILD 14 at the lower current threshold is a predetermined margin above a trigger point of the ILD 14. The lower current threshold is a point at which current through the ILD 14 is a predetermined amount less than the current through the ILD 14 at the upper current threshold, e.g. 75% of the upper current threshold, but is still sufficient to maintain the ILD 14 in the enabled state. The decay time of the voltage across the sensing device 38 is based on the recirculating current flowing through the ILD 14 and is therefore also a function of the resistive and inductive characteristics of the ILD 14. In response to the enable signal, the switching sub-circuit enables current induced by the voltage across the ILD 14 to flow through the ILD 14. This current timing cycle then repeats until the voltage potential from the power source 16 is disabled.

The switching sub-circuit 42 includes a voltage on/off switching device Q4 and a limiting resistor R13 connected between the negative terminal 22 and a shorting switching device Q1. The switching sub-circuit additionally includes a recirculating diode D1 and a current flow switching device Q2 connected to a threshold switching device Q3. In the exemplary embodiment illustrated in FIG. 1, the switching sub-circuit further includes limiting resistors R12 and R14 connected in series between the voltage on/off switching device Q4 and the current flow switching device Q2. Each of the switching devices Q1, Q2, Q3 and Q4 can be any suitable electronic switching device responsive to an input signal to switch between an ON or enabled state and an OFF or disabled state, such as a transistor, a FET or a MOSFET.

The voltage on/off switching device Q4 enables and disables the voltage potential across the ILD 14 in response to a signal from a discrete input device 46. The discrete input device 46 can be any device capable of transmitting a signal to switch the switching device Q4 between the OFF state, where the voltage potential is removed from across the ILD 14, and the ON state, where the voltage potential is applied across the ILD 14. For example, the discrete input device 46 could be a digital device or microprocessor output that provides a digital signal, e.g., either 0 volts or 5 volts, to the voltage on/off switching device Q4 to switch the voltage on/off switching device Q4 between the ON and OFF states. The shorting switching device Q1 shorts a recirculating current dissipation device 50 that can be any suitable current dissipating device such as an Zener diode or a resistor, as illustrated in FIG. 1. In an exemplary implementation of the present invention, as illustrated in FIG. 1, the shorting switching device Q1 is responsive to the voltage on/off switching device Q4 such that placing the voltage on/off switching device Q4 in the ON state also places the shorting switching device Q1 in the ON state. When the shorting switching device Q1 is ON a recirculating current path is provided from the ILD 14, through the recirculating diode Dl, the shorting switching device Q1, the sensing device 38 and back through the ILD 14. A leakage resistor R6 can be connected between the recirculating diode Dl and the current flow switching device Q2 to prevent leakage effects from inadvertently changing the state of the shorting switching device Q1.

The current flow switching device Q2 regulates or modulates the flow of current through the ILD 14 that is induced when the voltage potential across the ILD 14 is enabled, i.e. when voltage on/off switching device Q4 is in the ON state. When the voltage on/off switching device Q4, the shorting switching device Q1 and the current flow switching device Q2 are all in the ON state, a supply voltage current path is provided from the negative terminal 22, through the current flow switching device Q2, the ILD 14, the sensing device 38 to the positive terminal 18 The threshold switching device Q3 is connected to an output of the measuring sub-circuit 34 and controls the state of the current flow switching device Q2 in response to a signal output from the measuring sub-circuit 34. In the exemplary embodiment illustrated in FIG. 1, when the threshold switching device Q3 is placed in the OFF state, the current flow switching device is placed in the ON state, thereby enabling current induced by the voltage across the ILD 14 to flow through the ILD 14 via the supply voltage current path. But, when the threshold switching device Q3 is placed in the ON state, the current flow switching device is placed in the OFF state, thereby disabling the flow of current induced by the voltage across the ILD 14.

The measuring sub-circuit 34 includes the sensing device 38 and an amplifier device U1 connected across the sensing device 38 to measure a voltage induced across the sensing device 38 when current flows through the sensing device 38. The amplifier device U1 can be any device with a gain suitable to amplify the voltage across the sensing device 38 by a predetermined constant. The measuring sub-circuit 34 additionally includes a comparator device U2 having a first input connected to an output of the amplifier device U1, a second input tied to a reference voltage, e.g. 5 volts, and an output connected to the threshold switching device Q3. In the exemplary embodiment illustrated in FIG. 1, the measuring sub-circuit further includes a biasing diode D2 and a limiting resistor R11 connected between the comparator device U2 output and the threshold switching device Q3. The exemplary embodiment additionally includes a bypass resistor R9 around the comparator device U2, a pull-up resistor R10 from the output of the comparator device U2 to a reference voltage, a limiting resistor R8 between the output of the amplifier device U1 and the first input of the comparator device U2, and a bypass resistor R4 around the amplifier device U1. Further yet, the exemplary embodiment includes a limiting resistor R2 between a first side of the sensing device 38 and a first input of the amplifier device U1, a limiting resistor R3 between a second side of the sensing device 38 and a second input of the amplifier device U1, and feedback resistor R1 tied between the amplifier device U1 first input and ground. In the exemplary embodiment illustrated in FIG. 1, the resistors R1, R2, R3 and R4 determine the gain of the amplifier device U1. Additionally, the resistors R8 and R9 determine a high trip point and a low trip point of the comparator device U2, described below.

The sensing device 38 is connected in series with the ILD 14 such that any current flowing through the ILD, i.e. recirculating current and current resulting from the voltage across ILD 14, will flow through the sensing device 38. The amplifier device U1 amplifies the voltage across the sensing device generated by the current flowing through the sensing device 38 and the comparator device U2 compares the amplified voltage to the reference voltage. When the amplified voltage rises to substantially equal the reference voltage multiplied by the quantity of $(1+(R8/R9))$, i.e an upper trip point of the comparator device U2, the comparator device U2 changes states. When the comparator device U2 changes states the comparator device U2 outputs a signal that in turn changes the state of the threshold switching device Q3, which in turn changes the state of the current flow device Q2 to disable the voltage across the ILD 14 causing the current flowing through the ILD 14 to decrease. Conversely, when the amplified voltage decays to substantially equal the reference voltage, i.e. a lower trip point of the comparator device U2, the comparator device U2 flips states outputting a signal that in turn flips the state of the threshold switching device Q3. The change in state of the threshold switching device Q3 in turn changes the state of the current flow device Q2 to enable the voltage across the ILD 14 causing the current flowing through the ILD 14 to increase. Those skilled in the art will appreciated that comparator devices, such as comparator device U2, generally have a hysteresis property such that the comparator device U2 will not switch states until the amplified voltage rises to a level slightly higher than the reference voltage or decays to a level slightly below the reference level. Thus, the comparator device U2 changes states with the amplified voltage rise to an upper trip point slightly above the reference voltage of the comparator device U2 and again when the amplified voltage decays to a lower trip point slightly below the reference voltage.

Since the level of current flowing through the ILD 14 is a function of the resistive and inductive characteristics of the ILD 14, i.e. a function of the time constant L/R, the level of voltage across the sensing device 38 is also a function of resistive and inductive characteristics of the ILD 14. Therefore, the rise time for the current though the sensing device 38 to rise to substantially equal the upper current threshold, whereby the amplified voltage rises to substantially equal the upper trip point of the comparator device U2, is also a function of the resistive and inductive characteristics of the ILD 14 and the voltage supplied by the power supply 16. Similarly, the time for the current through the sensing device 38 to decay to substantially equal to the lower current threshold, whereby the amplified voltage decays to substantially equal the lower trip point of the comparator device U2 is a function of the resistive and inductive characteristics of the ILD 14. Thus, the timing of control circuit 10 used to modulate the flow of current through the ILD 14 is a function of the inductive and resistive characteristics of the ILD 14.

Figure 2:
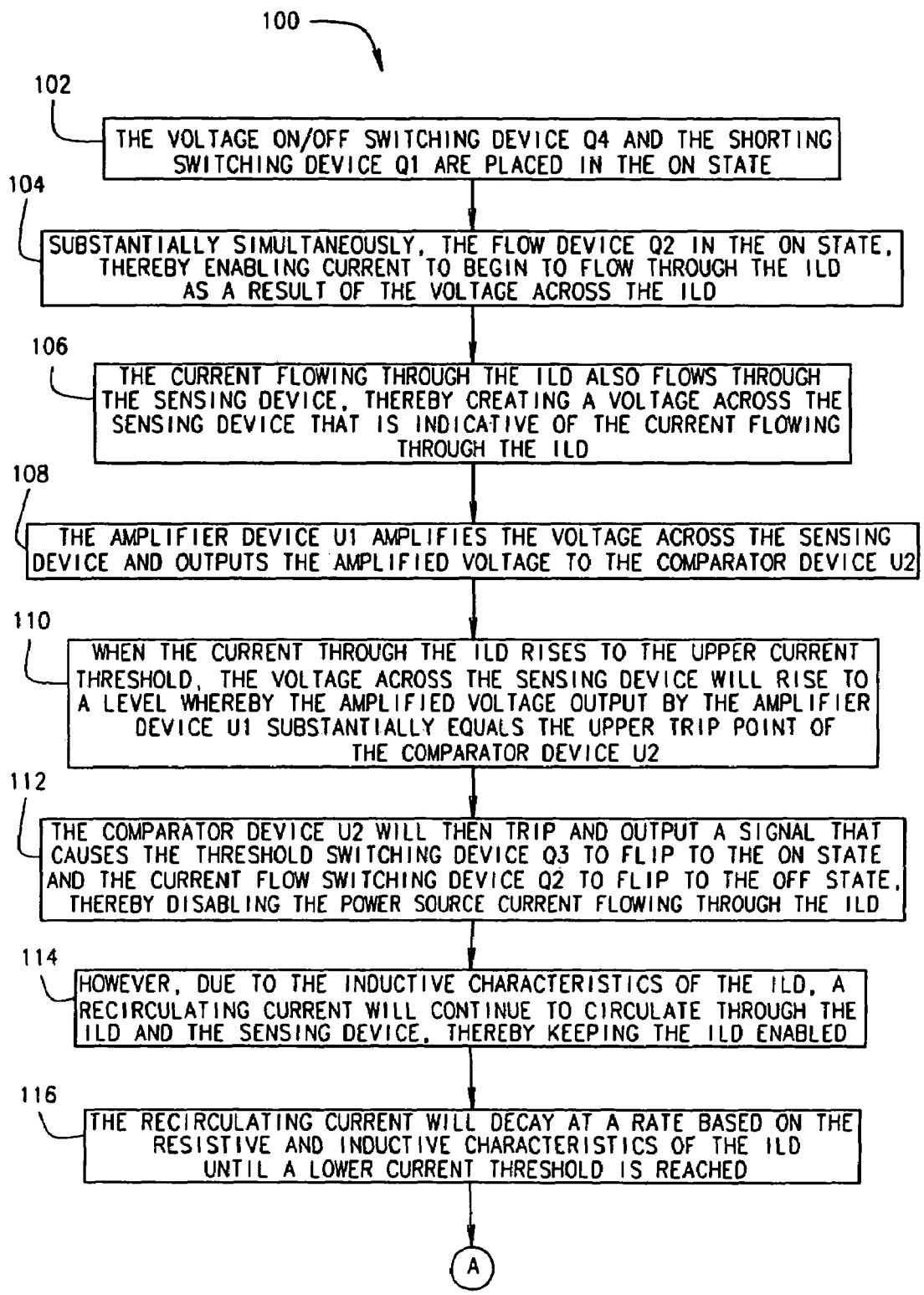
FIG. 2 is a flow chart illustrating the operation of the control circuit shown in FIG. 1, in accordance with the teachings of the present invention.
Figure 2A:
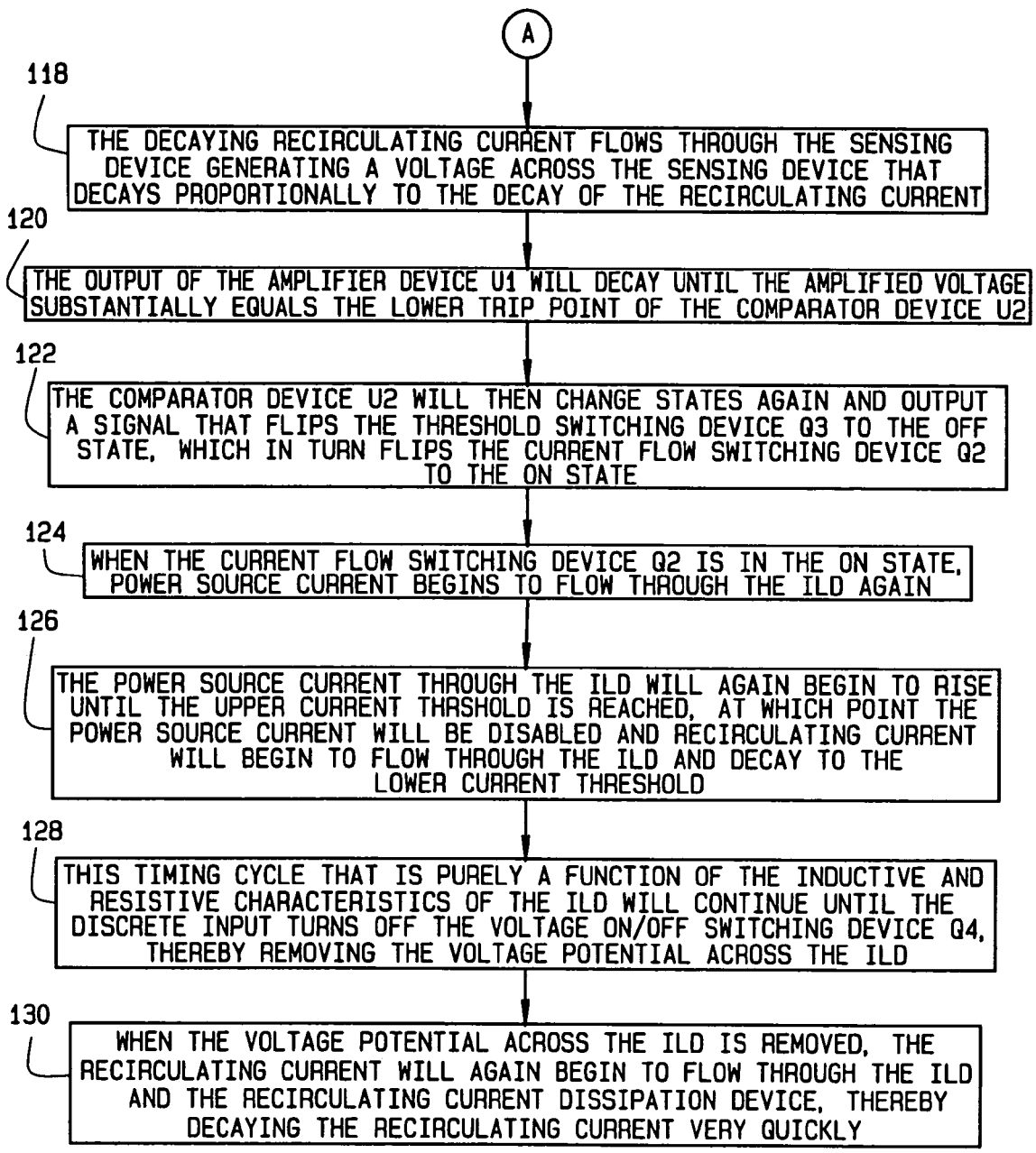
FIG. 2A is a continuation of the flow chart shown in FIG. 2.

Referring now to FIGS. 1 and 2, wherein FIG. 2 is a flow chart 100 illustrating the operation of the control circuit 10, in accordance with the teaching of the present invention. To turn on the ILD 14, the discrete input device 46 places the voltage on/off switching device Q4 in the ON state, which in turn places shorting switching device Q1 in the ON state, as illustrate at 102. This shorts the recirculating current dissipation device 50 and applies the voltage of the power source 16 across the ILD 14. Substantially simultaneously, the discrete input device 46 places the current flow device Q2 in the ON state, thereby enabling current to begin to flow through the ILD 14 as a result of the voltage across the ILD 14, as illustrated at 104. Current flowing through the ILD 14 that is induced by the voltage across the ILD 14 when the current flow switching device is in the ON state, will herein be referred to as power source current. When the power source current begins to flow through the ILD 14 the current level is initially zero. As the voltage remains applied to the ILD 14 the power source current will rise, dependant on the resistive and inductive characteristics of the ILD 14 and the voltage supplied by the power supply 16.

As described above, the current flowing through the ILD 14 also flows through the sensing device 38, thereby creating a voltage across the sensing device 38 that is indicative of the current flowing through the ILD 14, as indicated at 106. The amplifier device U1 amplifies the voltage across the sensing device 38 and outputs the amplified voltage to the comparator device U2, as described at 108. When the current through the ILD 14 rises to the upper current threshold, the voltage across the sensing device 38 will rise to a level whereby the amplified voltage output by the amplifier device U1 substantially equals the upper trip point of the comparator device U2, as indicated at 110. The comparator device U2 will then trip, or change states, and output a signal that causes the threshold switching device Q3 to flip to the ON state. This in turn causes the current flow switching device Q2 to flip to the OFF state and disable the power source current flowing through the ILD 14, as indicated at 112.

However, due to the inductive characteristics of the ILD 14, a recirculating current will continue to circulate through the ILD 14, the recirculating diode D1, the shorting switching device Q1 and the sensing device 38, thereby keeping the ILD 14 enabled, as indicated at 114. The recirculating current will decay at a rate based on the resistive and inductive characteristics of the ILD 14 until a lower current threshold is reached, as indicated at 116. The decaying recirculating current flows through the sensing device 38 generating a voltage across the sensing device 38 that decays proportionally to the decay of the recirculating current, as indicated at 118. Thus, the output of the amplifier device U1 will decay until the amplified voltage substantially equals the lower trip point of the comparator device U2, as indicated at 120. The comparator device U2 will then change states again and output a signal that flips the threshold switching device Q3 to the OFF state, which in turn flips the current flow switching device Q2 to the ON state, as indicated at 122. When the current flow switching device Q2 is in the ON state, power source current begins to flow through the ILD 14 again, as indicated at 124. The power source current through the ILD 14 will again begin to rise until the upper current threshold is reached, at which point the power source current will be disabled and recirculating current will begin to flow through the ILD 14 and decay to the lower current threshold, as indicated at 126. This timing cycle is purely a function of the inductive and resistive characteristics of the ILD 14 and the voltage supplied by the power supply 16 will continue until the discrete input 46 places the voltage on/off switching device Q4 in the OFF state, thereby removing the voltage potential across the ILD 14, as indicated at 128.

When the voltage potential across the ILD 14 is removed, the recirculating current will again begin to flow through the ILD 14. However, when the voltage on/off switching device Q4 is placed in the OFF state, the shorting switching device Q1 is flipped to the OFF state so that the recirculating current is forced to flow through the recirculating current dissipation device 50 and the recirculating diode D1. The recirculating current dissipation device 50 and the recirculating diode D1 cause recirculating current to decay very quickly so that the energy stored in the ILD 14 is dissipated very quickly to avoid unwanted wear on the ILD 14, as indicated at 130.

In an exemplary implementation of the present invention, if the voltage supplied by the power source 16 drops to level where the power source current flowing through the ILD 14 can not reach the upper current threshold, the current flow switching device Q2 remains in the ON state. Therefore, the current available at that voltage level is applied and the circuit will operate as described above when the voltage level recovers or comes back up.

Figure 3:
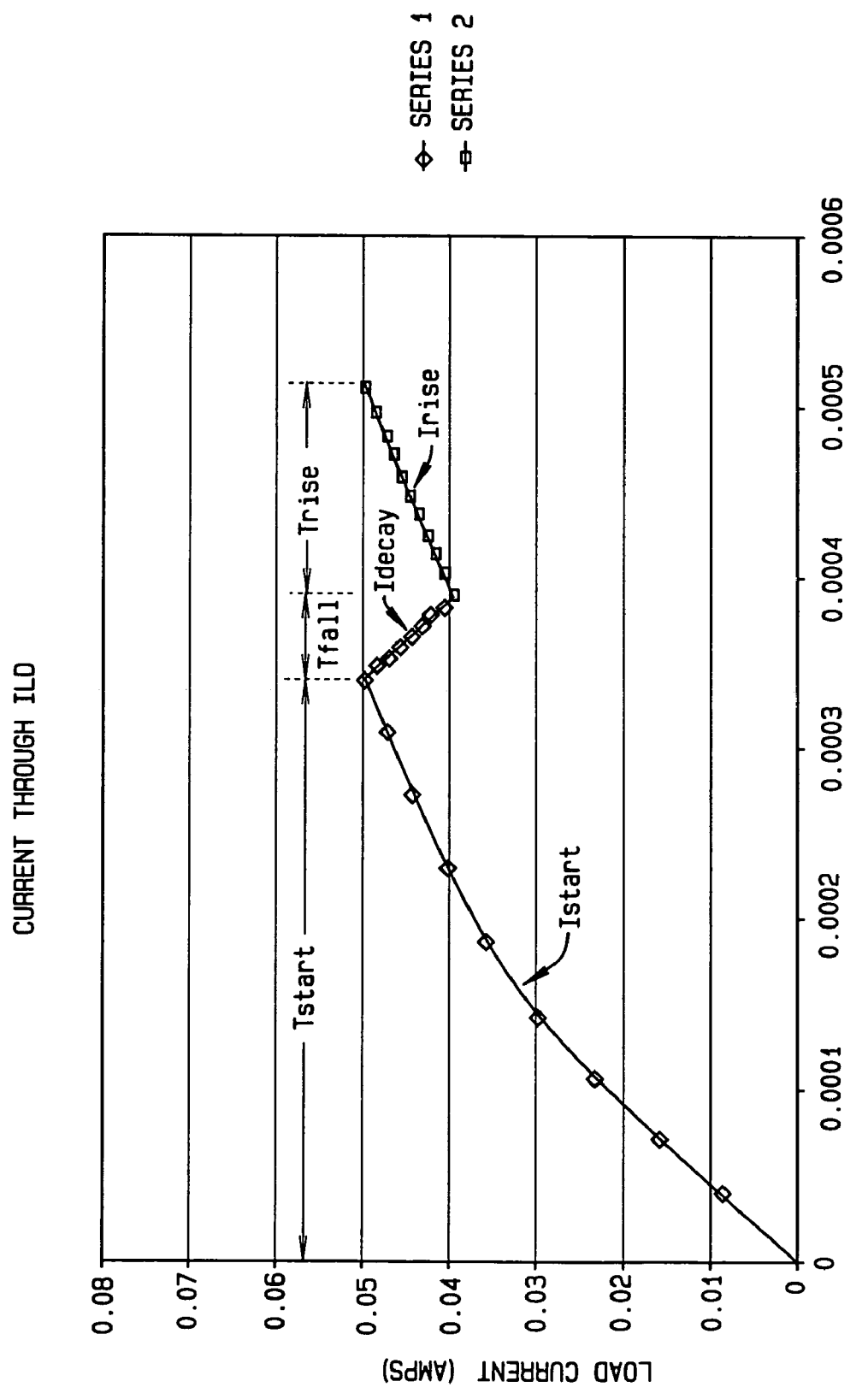
FIG. 3 is an exemplary graphical representation of the time versus current through the inductive load device, in accordance with the teaching of the present invention.

Referring now to FIGS. 1 and 3, wherein FIG. 3 is an exemplary graphical representation of the time versus current through the inductive load device, in accordance with the teaching of the present invention. When the voltage on/off switching device Q4, the shorting switching device Q1 and the current flow switching device Q2 enable the voltage of the power source 16 across the ILD 14, as described above, the power source current through the ILD 14 begins to rise, as illustrated by Istart in FIG. 3. In the exemplary embodiment illustrated in FIG. 3, the power source current rises in accordance with the following equation:

$$I\text{start} = (V_{ps}/R)*(1-\epsilon^{-Rt/L}),$$

wherein $V_{ps}$ equal the voltage of the power source 16 and R and L respective equal the resistance and inductance of the ILD 14. Therefore, the time for the power source current to reach the upper current threshold, illustrated as Tstart, is determined in accordance with the following equation:

$$T\text{start} = -(L/R)*\ln((V_{ps}/R)-I_{max})/(V_{ps}/R),$$

wherein $I_{max}$ = the current that when amplified by the amplifier device U1, after flowing through the sensing device 38, creates a voltage equal to the upper trip point of the comparator device U2

When the power source current reaches the upper current threshold at the end of Tstart, the recirculating current begins to flow through the ILD 14 and decay, as described above, illustrated as Idecay. In the exemplary embodiment illustrated in FIG. 3, the recirculating current decays in accordance with the following equation:

$$I\text{decay} = I_{max}*\epsilon^{-Rt/L} - (V_{D1}/R)*(1-\epsilon^{-Rt/L}),$$

wherein $V_{d1}$ equals the value of the recirculating diode D1. Therefore, the time for the recirculating current to decay and reach the lower current threshold, illustrated as Tfall, is determined in accordance with the following equation:

$$T\text{fall} = -(L/R)*\ln((I_{min}+V_{D1}/R)/(I_{max}+V_{D1}/R)),$$

wherein $I_{min}$ equals the current that when amplified by the amplifier device U1, after flowing through the sensing device 38, creates a voltage equal to the lower trip point of the comparator device U2.

When the recirculating current decays to the lower current threshold at the end of Tfall, the power source current begins to flow through the ILD 14 and rise again, as described above, illustrated as Irise. In the exemplary embodiment illustrated in FIG. 3, the power source current now rises in accordance with the following equation:

$$Irise = ((V_{ps}/R)*(1-\epsilon^{-Rt/L})) + (I_{min}*\epsilon^{-Rt/L}).$$

Therefore, the time for the power source current to rise and reach the upper current threshold again, illustrated as Trise, is determined in accordance with the following equation:

$$Trise = -(L/R)*\ln((I_{max}-V_{ps}/R)/(I_{min}-V_{ps}/R)).$$

Thus, by controlling the state of the current flow switching device Q2, i.e. turning the current flow switching device Q2 on and off, the current from the power source 16 through the ILD 14 is controlled based on the resistive and inductive characteristics of the ILD 14. That is, the amount of time that the current flow switching device Q2 is ON, allowing power source current to flow through the ILD 14, is dynamically determined by the resistive and inductive characteristics of the ILD 14 each time the current flow switching device Q2 is turned ON. Likewise, the amount of time that the current flow switching device Q2 is OFF and recirculating current flows through the ILD 14, is dynamically determined by the resistive and inductive characteristics of the ILD 14 each time the current flow switching device Q2 is turned OFF. This cycle, wherein the timing is dynamically determined by the resistive and inductive characteristics of the ILD 14, is continuously repeated and thereby operates the ILD 14 at an efficient power level without excessive power loss and dissipation. Thus, the control circuit 10 of present invention does not require a clock and the timing is defined solely by the resistive and inductive characteristics of the ILD 14.

While the invention has been described in terms of various specific embodiments, those skilled in the art will recognize that the invention can be practiced with modification within the spirit and scope of the claims.

What is claimed is:

1. A current control circuit for an inductive load device (ILD), said current control circuit comprising:
   a measuring sub-circuit for measuring current flowing through the ILD, wherein an amount of current flowing through the ILD is based on a resistive characteristic and an inductive characteristic of the ILD; and
   a switching sub-circuit for responding to an output of the measuring sub-circuit to thereby control a duration of current flow through the ILD as a function of the resistive and inductive characteristics of the ILD, the switching sub-circuit comprising:
      a voltage on/off switching device for controlling application of a voltage across the ILD;
      a shorting switching device responsive to the voltage on/off switching device for shorting a recirculating current dissipation device; and
      a current flow switching device for regulating a flow of current from a power source through the ILD and the shorting switching device.

2. The current control circuit of claim 1, wherein the switching sub-circuit further comprises a threshold switching device connected to an output of the measuring sub-circuit for controlling a state of the current flow switching device.

3. The current control circuit of claim 2, wherein the measuring sub-circuit comprises:
   a sensing device in series with the ILD such that current flowing through the ILD will flow through the sensing device;
   an amplifier device for amplifying a voltage across the sensing device generated by the current flowing through the sensing device: and
   a comparator device for comparing the amplified voltage to a reference voltage and enabling or disabling the threshold switching device based on the amplified voltage.

4. The current control circuit of claim 3, wherein the measuring sub-circuit is configured to:
   amplify the voltage across the sensing device generated by power source current flowing through the sensing device; and
   enable the threshold switching device when the power source current through the switching device rises to substantially equal an upper threshold causing the amplified voltage to rise to effectively equal an upper trip point of the comparator device, thereby disabling the current flow switching device and disabling the flow of power source current through the ILD,
   wherein an amount of time the flow of power source current is enabled is a function of the resistive and inductive characteristics of the ILD.

5. The current control circuit of claim 4, wherein the measuring sub-circuit is further configured to:
   amplify the voltage across the sensing device generated by recirculating current flowing through the sensing device when the power source current is disabled; and
   disable the threshold switching device when the recirculating current through the switching device decays to substantially equal lower threshold causing the amplified voltage to decay to effectively equal a lower trip point of the comparator device, thereby enabling the current flow switching device and enabling the flow of power source current through the ILD,
   wherein an amount of time the flow of recirculating current flows through the ILD is a function of the resistive and inductive characteristics of the ILD.

6. A method for regulating current through an inductive load device, said method comprising:
   providing a voltage across the inductive load device (ILD) causing current to flow through the ILD that is a function of resistive and inductive characteristics of the ILD;
   measuring a voltage across a sensing device of a control circuit connected to the ILD, the voltage induced by the current flowing through the ILD;
   disabling a flow of current through the ILD resulting from the voltage across the ILD when the voltage across the sensing device rises to substantially equal an upper threshold value, wherein the time for the voltage across the sensing device to rise to the upper threshold is a function of the resistive and inductive characteristics of the ILD;
   measuring a voltage across the sensing device induced by a recirculating current generated by the ILD when the current through the ILD resulting from the voltage across the ILD is disabled; and
   enabling the flow of current through the ILD resulting from the voltage across the ILD when the voltage across the sensing device decays to substantially equal a lower threshold value, wherein the time for the voltage across the sensing device to decay to the lower threshold is a function of the resistive and inductive characteristics of the ILD.

wherein providing a voltage across the ILD comprises enabling a voltage on/off switching device and a current flow switching device, whereby enabling the voltage on/off switching device enables a shorting switching device thereby allowing the current to flow through the ILD resulting from the voltage across the ILD.

7. The method of claim 6, wherein measuring the voltage across the sensing device induced by the current flowing through the ILD comprises:

inputting the voltage across the sensing device to an amplifier device of the control circuit; and inputting an amplified voltage output by the amplifier device to a comparator device of the control circuit to compare the amplified voltage to a reference voltage.

8. The method of claim 7, wherein disabling the flow of current through the ILD when the voltage across the sensing device rises to substantially equal an upper threshold value comprises enabling a threshold switching device when the amplified voltage effectively equals an upper trip point of the comparator device, whereby enabling the threshold switching device disables the current flow switching device, thereby stopping the flow of current through the ILD generated by the voltage across the ILD.

9. The method of claim 8, wherein measuring the voltage across the sensing device induced by the recirculating current comprises:

inputting the voltage across the sensing device to the amplifier device; and inputting an amplified voltage output by the amplifier device to the comparator device to compare the amplified voltage to the reference voltage.

10. The method of claim 9, wherein enabling the flow of current through the ILD when the voltage across the sensing device decays to substantially equal a lower threshold value, comprises disabling the threshold switching device when the amplified voltage decays to a lower trip point of the comparator, whereby disabling the threshold switching device enables the current flow switching device, thereby allowing the flow of current through the ILD generated by the voltage across the ILD.

* * * * *